United States Patent [19]

Haas

[11] Patent Number: 4,903,254

[45] Date of Patent: Feb. 20, 1990

[54] TIME INDICATOR ENHANCEMENT METHOD

[76] Inventor: David J. Haas, P.O. Box 659, Spring Valley, N.Y. 10977-0659

[21] Appl. No.: 401,080

[22] Filed: Aug. 31, 1989

[51] Int. Cl.⁴ ...................... G04B 17/00; G01N 31/32

[52] U.S. Cl. ...................................... 368/327; 116/200

[58] Field of Search ................. 368/62, 114, 121, 327; 116/200, 207, 219, 308

[56] References Cited

U.S. PATENT DOCUMENTS

| | | | |
|---|---|---|---|
| 2,337,534 | 12/1943 | Barber | 35/1 |
| 3,078,182 | 2/1963 | Crone et al. | 117/68.5 |
| 3,520,124 | 7/1970 | Myers | 58/1 |
| 3,999,946 | 12/1976 | Patel et al. | 23/253 |
| 4,212,153 | 9/1980 | Kydonieus et al. | 368/62 |
| 4,367,957 | 1/1983 | Bradley | 368/114 |
| 4,408,557 | 10/1983 | Bradley et al. | 368/327 |
| 4,643,122 | 2/1987 | Seybold | 116/206 |
| 4,646,066 | 2/1987 | Baughman et al. | 340/540 |
| 4,737,463 | 4/1988 | Bhattacharjee et al. | 436/2 |

*Primary Examiner*—Vit W. Miska
*Attorney, Agent, or Firm*—Weingram & Zall

[57] ABSTRACT

A time indicator for use as a security badge. The badge includes a four-layer front part and a two-layer rear part. The front part has, overlying each other, a transparent front support layer with a front print display surface, an adhesive and ink display layer with a front ink display surface, an optical barrier layer; and an adhesive and ink dissolver layer. The rear part has, overlaying each other, an ink film layer and a backup member layer. Upon issue of the badge, a release sheet is peeled off the ink film layer, and the front part is overlaid and pressed down upon the rear part, with the adhesive and ink dissolver layer and the ink film layer forming an assembly joint therebetween. The time interval then begins and the ink migrates from the ink film layer, in series, through the assembly joint, the ink dissolver layer, the optical barrier layer, the adhesive and ink display layer to the front ink display surface, where it forms expiration notice words and diagonal voiding bars after expiration to the time interval.

15 Claims, 2 Drawing Sheets

TIME INDICATOR ENHANCEMENT METHOD

BACKGROUND OF THE INVENTION

1. Field of the Invention

This invention relates to a time indicator and, in particular, to a time indicator badge which provides a clearer indication of expiration.

2. Prior Art

A preferred prior art time indicator is described in U.S. Pat. No. 4,212,153, of Kydonieus et al. This invention is an improvement thereon. Other relevant patents include U.S. Pat. Nos. 2,337,534, to Barber, 3,078,182, to Crone, Jr., et al., 3,520,124, to Myers, 3,999,946, to Patel, et al., 4,643,122, to Seybold. 4,646,066, to Baughman, et al., and 4,737,463 to Bhattacharjee, et al.

U.S. Pat. No. 4,212,153 to Kydonieus et al, describes a laminated time indicator including a two-layer front indicator part and a two-layer rear reservoir part. The front indicator part has an indicator layer with an outer display surface and an inner surface having an adhesive layer thereon. For example, a pressure- sensitive adhesive coated onto an opaque barrier layer such as vinyl. The rear reservoir part has a dye or ink film layer and a support card layer. When assembled, the front part is placed on the rear part with the ink film layer forming an assembly joint with the adhesive layer. The dye or ink dissolves in the adhesive. After a period of time, the ink migrates from the ink film layer through the adhesive layer and indicator layer to be displayed on the outer surface. In one day, for example, the dye or ink may only reach 20% to 30% of its potential color capacity due to the gradual migration (or adsorption) of the dye into the opaque indicator layer and due to the fact that as the concentration of dye increases at the surface, the process rate decreases. Thus, there is no clear indication of when the indicator expires. It is believed that the reason this prior art device has such deficiencies is due to the fact that the opaque indicator layer must be relatively thick to provide mechanical strength. Such thickness creates a long path through which the dye or ink must migrate, this causing a gradual darkening of the indicator. Further, the opaque indicator layer must have a relatively large quantity of filler, e.g. titanium dioxide, to make it opaque, not just translucent. This filler intermixes and/or adsorbs the dye as the dye migrates through the indicator layer and dilutes or decreases the intensity of the dye. Thus, a red dye or ink will mix and/or be adsorbed with the titanium dioxide and become pink. Applicant's invention overcomes these deficiencies.

U.S. Pat. No. 2,337,534 to Barber, describes a magazine page exposure time indicator including a photosensitive paper sheet mounted on a magazine page, and a developed photographic film sheet having a series of adjacent portions of varying density mounted over the photosensitive paper sheet.

With respect to the other relevant art:

U.S. Pat. No. 3,078,182 to Crone, Jr., describes a heat-sensing, color-changing, adhesive tape for a device to be sterilized in a hospital autoclave including an adhesive layer for attachment, a backing web over the adhesive layer and a visible colored layer over the backing web wherein the colored layer comprises a selective pigment dispersed in a resin binder.

U.S. Pat. No. 3,520,124 to Myers, describes a parked car . time indicator including a first sheet having a first reactant and a second sheet having a second reactant and a release sheet which is peeled away to permit contact of the first sheet with the second sheet to start a reaction over a selective time interval terminating with a color change of the reactants.

U.S. Pat. No. 3,999,946 to Patel, describes a perishable product time-temperature history indicator including a substrate for attachment to the product .showing changes in temperatures along a Y-ordinate over periods of time along an X-ordinate.

U.S. Pat. No. 4,643,122 to Seybold, describes a tamper-indicating security tag including a carrier material impregnated with a solution of a selective compound with a solvent for use in a sealed enveloping container which controls the rate of diffusion of the solvent.

U.S. Pat. No. 4,646,066 to Baughman, describes an environmental exposure indicator device including a target made of a tuned circuit and selective element which receives an interrogation signal in the radio or microwave frequency range and including an antenna which then receives and converts the signal to an electrical current, wherein the selective element has an electrical property that changes in response to an environmental exposure, such as temperature, combined time-temperature, humidity, radiation, a particular fluid, or mechanical shock.

U.S. Pat. No. 4,737,463 to Bhattacharjee, describes a perishable product, photoactivatable time-temperature indicator comprising a mixture of a thermally unreactive diacetylenic compound, and a photosensitive compound that, on exposure to actinic radiation, forms an acid that converts the diacetylene to a thermally reactive product, and an aqueous polymeric medium.

OBJECTS AND SUMMARY OF THE INVENTION

It is an object of this invention to provide a time indicator badge which provides a clear indication of expiration.

It is a further object of this invention to provide a time indicator badge which provides a relatively clearer indication of expiration over a relatively short period of time.

The foregoing objects, as well as others, is achieved by the time indicator badge of this invention. The badge includes a four-layer front part and a two layer rear part. The front part has, overlaying each other, (1) a transparent front support layer with a front print display surface, (2) an adhesive and ink display layer with a front ink display surface, (3) an optical barrier layer; and (4) an adhesive and ink dissolver layer. The rear part has (1) an ink film layer overlaying (2) a backup member layer.

Upon issuance of the badge, a release sheet is peeled off the front part and it is overlaid and pressed down upon the rear part, with the adhesive and ink dissolver layer and the ink film layer forming an assembly joint therebetween. This causes the ink dissolver and ink film to mix. The ink then migrates from the ink film layer, through the assembly joint, through the ink dissolver layer, through the optical barrier layer, through the adhesive and ink display layer to the front ink display surface, where it forms expiration notice words and diagonal voiding bars at the expiration of the time interval. A viewer can see the user name and category on the front print display surface, as placed thereon upon issue. Upon expiration, the viewer can see the expiration notice words and diagonal voiding bars on the front ink display surface behind the front print display surface.

The foregoing and other objects, features and advantages will be apparent from the following description of the preferred embodiment of the invention as illustrated in the accompanying drawings.

DESCRIPTION OF THE PREFERRED EMBODIMENT

Figure 1:
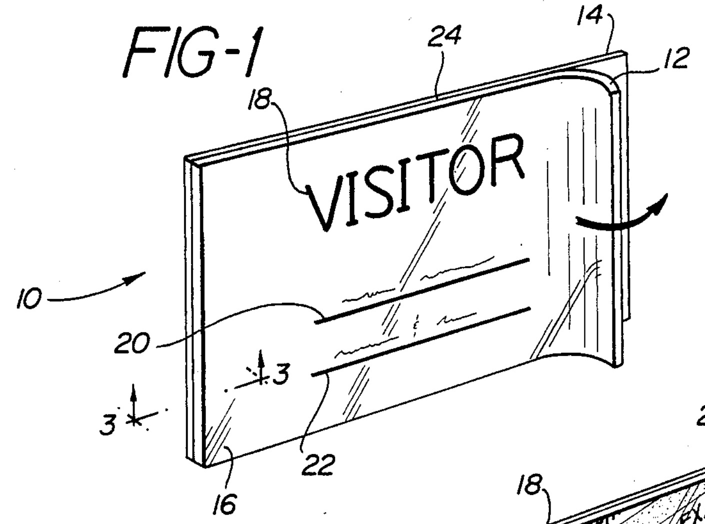
FIG. 1 is a perspective view of a time indicator badge according to the present invention.

As shown in FIG. 1, a time indicator badge 10 is provided. Badge 10 is assembled by a security person, and is delivered to a visitor to a facility, and expires after a specific time interval.

Figure 3:
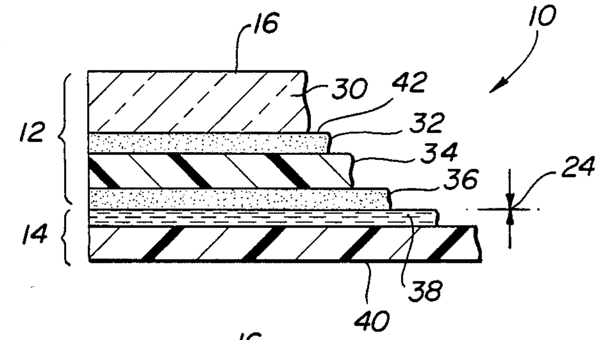
FIG. 3 is a partial section view as taken along the line 3—3 of FIG. 1.

Broadly, the time-dependent badge 10 of this invention uses the principal of migrating ink. Referring to FIGS. 1 and 3, the badge 10 is made of two parts (12 and 14), the front part 12 being the face of the badge or credential and the back portion 14 having stripes printed with a special ink 38 that migrates through the front portion 12. Thus, when the badge 10 is issued, the self-adhesive face or front portion 12 is placed over the back part 14 and the timing process begins. The ink 38 passes or migrates through the badge to the front part 12 in approximately the predetermined time period whereupon the printed stripes become visible, thus alerting the guard to check the actual date written on the badge.

Figure 2:
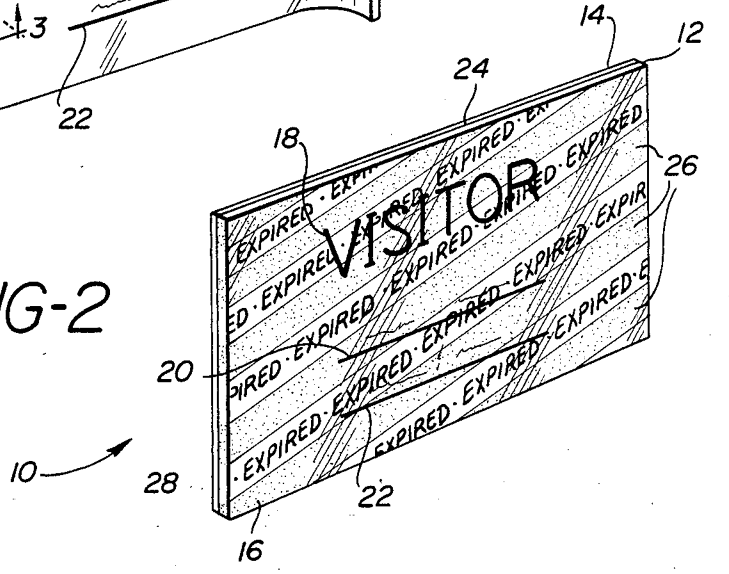
FIG. 2 is a perspective view corresponding to FIG. 1 of the time indicator badge, after expiration thereof.

More particularly, referring to FIGS. 2 and 3, badge 10 has a front indicator portion 12 and a rear reservoir portion 14. Front part 12 has a front print display surface 16. The print display surface has the word "VISITOR" imprinted thereon 18, and has a visitor name line 20 whereon the security person can write the name of the visitor. The badge also has a company name line 22 whereon the security person can write the name of the visitor's company. The security person then joins the front part 12 to the rear part 14 forming an assembly joint or construction line 24.

As shown in FIG. 2, after the time interval has elapsed, badge 10 has a plurality of diagonal voiding bars 26 and a plurality of "EXPIRED" notice words 28 displayed through the print display surface 16.

Figure 4:
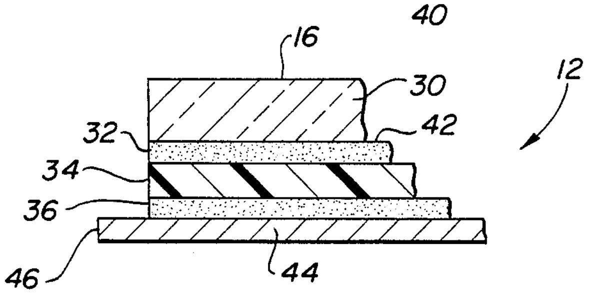
FIG. 4 is a partial section view corresponding to the front portion of FIG. 3, before assembly thereof.

As shown in FIGS. 3 and 4, front part 12 has overlying each other a transparent front support layer or clear plastic sheet 30, an adhesive and ink display layer 32, a white barrier layer 34, and an adhesive and ink dissolver layer 36. Transparent layer 30 is an impervious external support layer which is composed of an acetate film, or polyester film. Adhesive and ink display layer 32 is supported by transparent layer 30. Barrier layer 34 is supported by adhesive and ink display layer 32, and has a relatively thin thickness of about 0.0005 to 0.0020 inches, and acts as an optical barrier and backup for displaying ink letters 28 and ink bars 26. Preferably, the ink or dye has a red color. Adhesive and ink dissolver layer 3 is supported by barrier layer 34.

Still referring to FIGS. 3 and 4, rear part 14 has a migrating red ink patterned film or layer 38 and has a support card 40. Ink layer 38 is loosened and dissolved by adhesive and ink dissolver layer 36 after front part 12 is joined to rear part 14 along assembly joint 24. Ink patterned layer 38 is dissolved and then travels or migrates through layers 36,34,32 to an ink display surface 42 or layer 32.

As shown in FIG. 4, wherein only front part 12 is shown before assembly thereof, a release paper 44 is provided which has an overhang portion 46. Release paper 44 is peeled away from layer 36 by gripping overhang portion 46 between two fingers, and by pulling release paper 44 gradually away from layer 36. Thereafter, front part 12 is aligned along its edges with rear part 14 (see FIG. 1) and front part 12 is pressed down on rear part 14, whereby the assembly of badge 10 is completed as shown in FIG. 3.

When badge 10 is issued, the self-adhesive front part 12 is placed over rear part 14 and the time process begins. In this embodiment, badge 10 is a one-day badge and has a length of about three inches and a width of about two inches and a thickness of less than one-eighth inches. To issue badge 10, the desired data is filled in on front surface 16, release paper 44 is peeled off, and front part 12 is placed over rear part 14. The red indicator bars 26 and expiration words 28 appear after expiration of the approximate time period.

Barrier layer 34, which is supported by transparent layer 30, has a minimal thickness, thereby providing a relatively short travel path for ink patterned film 38 to ink display surface 42. Ink patterned film 38, which has a relatively dark red color, does not become pink due to its contact with any material in the barrier layer 34 during its travel through barrier layer 34.

Transparent layer 30, which is a clear inert acetate film, has a selected thickness. Layer 30 provides mechanical support and rigidity, and supports barrier layer 34. Layer 30 permits barrier layer 34 to be as thin as desired. Barrier layer film 34 is thin and opaque and permits the ink or dye to pass through it rapidly and does not cause the ink or a dye to become adsorbed directly into the film 34 causing dispersion or lack of clarity as experienced with prior art devices.

Transparent layer 30 also prevents passage of foreign inks or dyes from entering into layer 30 through the front print surface 16 of layer 30. For example, if two badge samples are stored in an envelope with opposing front and back parts facing each other, a foreign ink or dye from the rear part of one badge will not pas through and damage the front part of the other badge as layer 30 prevents any passage therethrough.

Adhesive and ink display layer 32 adsorbs the patterned ink after the patterned ink migrates through layer 36 and layer 34. Thus, the patterned ink in layer 32 is in front of the white background of barrier layer 34, does not mix with any white pigment or the like in barrier layer 34, and becomes concentrated in layer 32 so that a relatively dark red color of ink is provided. Ink display layer 32 thereby provides a concentration function to achieve a relatively pure, non-diluted ink.

The varying time periods for the time dependent badges 10 are controlled by different face portions 12 of the badge 10. All time dependent badges may use the same migrating ink, permitting any of the various back portions 14 to be used with the different faces 12. A time dependent one day badge may be used with a self-adhesive paper back portion whereas a longer time dependent badge, the one week and one month badges, may be used with a stiffer laminated badge.

Thus, in summary, the advantages of badge 10 are:

(a) A relatively dark display ink color is provided and such color becomes darker as the time interval progresses, because adhesive and ink display layer 32 receives a relatively high concentration of the ink.

(b) A sharper time window and more accurate expiration time is provided because of the coaction of layers 32,34,36. When front part 12 and back part 14 are assembled, the ink from ink layer 38 dissolves into the adhesive and dissolves layer 36 within a few hours. When the ink reaches barrier layer 34, the ink passes therethrough relatively rapidly because the barrier layer 34 is relatively thin; i.e., about 0.0005 to 0.0020 inch thickness. Subsequently, the ink dissolves into adhesive and ink display layer 32 and the ink color rapidly increases. In this way, a relatively long latent period exists after parts 12,14 are assembled, followed by a relatively fast appearance of ink color, thereby providing a clearly defined expiration time.

(c) The final color of the ink is relatively dark because all of the ink is concentrated in front of the barrier layer 34 and the mixture of ink and a barrier layer material is minimized.

(d) Because barrier layer 34 is relatively thin, the badge timing control is the activity of the adhesive and ink dissolver layer 36. The time interval of badge 10, which is from start time to expiration time, is set by adjusting the thickness and chemical composition of adhesive and ink dissolver layer 36 only.

(e) The white background of badge 10 remains white for a relatively longer percentage of the time interval, and the ink color of badge 10 is relatively darker after expiration, and the ink color dilution in badge 10 is minimized, as compared to that of the prior art time indicator.

(f) Badge 10 does not absorb foreign ink or the like through its front surface 16 and does not permit loss of ink therethrough.

The time indicator of this invention may be incorporated into a variety of other timing indicators, as well as security badges. Such timing indicators could be used for indicating service time intervals, warning time intervals, reminder time intervals, voiding documents after a prescribed time, food and biological timing indicators, and the like. This invention provides for an accurate and practical color changing indicator.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A time indicator comprising:
a transparent front support layer with a front print display surface;
an ink display layer with a front ink display surface overlaying said support layer;
an optical barrier layer overlaying said display layer;
an ink dissolver layer overlaying said barrier layer;
an ink film layer overlaying said dissolver layer; and
a backup member layer, overlaying said film layer;
whereby migration of ink is provided in a selected time interval from the ink .film layer, in series, through the ink dissolver layer, through the optical barrier layer, through the ink display layer, to the front ink display surface.

2. The indicator of claim 1, wherein the transparent front support layer is a clear plastic sheet.

3. The indicator of claim 1, wherein the optical barrier layer has a white color and the ink has a contrasting color.

4. The indicator of claim 1, wherein the optical barrier has a thickness of between 0.0005 to 0.0020 inches.

5. The indicator of claim 1, wherein the ink is composed of a dye material.

6. The indicator of claim 1, wherein the backup member layer is a support card layer.

7. The indicator of claim 1, wherein the indicator is a security badge.

8. The indicator of claim 7, wherein the front print display surface has identification indicia for identifying the user of the badge.

9. The indicator of claim 8, wherein the indicia includes a plurality of printed letters describing the category of the user, and includes at least one line for writing in the name of the user.

10. The indicator of claim 1, wherein the adhesive and ink display layer is supported by the transparent front support layer;
and the optical barrier layer is supported by the adhesive and ink display layer;
and the ink film layer is supported by the adhesive and ink dissolver layer;
and the backup member layer is supported by the ink film layer.

11. The indicator of claim 1, wherein the adhesive and ink dissolver layer has a thickness and a chemical composition which are adjustable for setting the indicator time interval.

12. The indicator of claim 1, wherein the transparent front support layer is composed of an impervious material to prevent passage of foreign liquid into the indicator and to prevent passage of ink out from the indicator.

13. A time indicator comprising:
a four-layer front indicator part;
a two-layer rear reservoir part overlaying said front part;
and an assembly joint therebetween due to assembly thereof;
wherein the four-layer front indicator part comprises:
a transparent front support layer with a front print display surface;
an adhesive and ink display layer with a front ink display surface overlaying said support layer;
an optical barrier layer overlaying said display layer; and
an adhesive and ink dissolver layer overlaying said barrier
layer; and
wherein the two-layer rear reservoir part comprises:
an ink film layer; and
a backup member layer overlaying said ink film layer,
whereby migration of ink is provided in a selected time interval upon the assembly thereof from the ink film layer, in series, through the assembly joint, through the adhesive and ink dissolver layer, through the optical barrier layer, through the adhesive and ink display layer, to the front ink display surface.

14. The indicator of claim 13, wherein the adhesive and ink dissolver layer has a release sheet before assembly thereof which is removed during assembly of the front part to the rear part.

15. A time indicator subassembly comprising:

a transparent front support layer with a front print display surface;

an ink display layer with a front ink display surface overlaying said support layer;

an optical barrier layer overlaying said display layer; and an adhesive and ink dissolver overlaying said barrier layer.

* * * * *